United States Patent Office 2,878,690
Patented Mar. 24, 1959

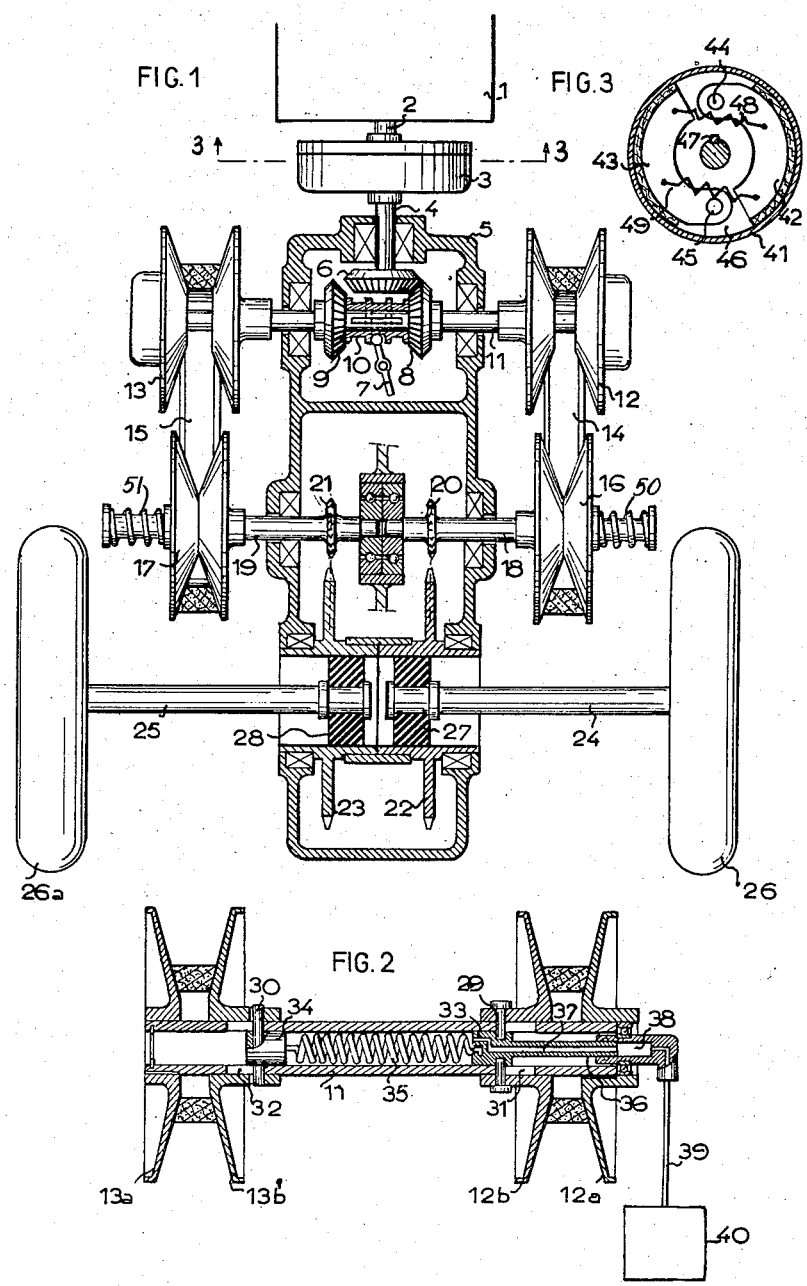

2,878,690

VARIABLE SPEED MULTIBELT TRANSMISSION

Michel Victor Fernand Capron, Paris, and Edmund Uher, Antibes, France

Application March 16, 1956, Serial No. 572,112

1 Claim. (Cl. 74—665)

This invention relates to a drive for a train of independent driving wheels.

The main object of the invention is to provide a drive for the purpose set forth, wherein the driving torque is transmitted to the independent wheels through separate V-belt torque convertors, whereby said wheels are capable of rotating at different speeds, while both exerting their propelling function, which permits omitting the usual differential and change speed gears and, hence, reducing the weight, cost and complexity of the drive.

Another object of the invention is to drive both above mentioned torque convertors from one single engine, a reversing gear, completed if required by a clutch or the like, being interposed between said engine and convertors to provide forward and rearward drive and out-of-gear conditions.

Still another object of the invention is to provide a drive of the type described, wherein positive transmission means are interposed between the driven shaft of the reversing gear and the driving pulleys of both convertors as well as between the driven pulleys of the latter and the vehicle wheels, the drive being, furthermore, provided with means to automatically adjust the average of the transmission ratios of the convertors, e. g. as a function of the number of turns of the engine, said means further permitting free differential adjustment of the said ratios proper for each value of said average.

The automatic variation of the average of the transmission ratios is preferably obtained by means of a hydraulic control system.

Preferred embodiments of the invention will be hereinafter described with reference to the accompanying drawings, given merely by way of example and in which:

Fig. 1 is a top partly sectional view of a differential drive according to the invention.

Fig. 2 is an enlarged axial sectional view of the common driving shaft of both convertors with a diagram of the above mentioned hydraulic control system.

Fig. 3 shows a diametral section of an automatic friction clutch adapted to be used in the drive according to the invention.

As shown in Fig. 1, a drive according to the invention comprises an engine 1 (shown as a block in the drawing) on the driving shaft 2 of which is keyed the driving member of a clutch 3, of which the driven member is keyed on the primary shaft 4 of a reversing gear generally shown at 5. The latter is constituted, in the example shown, by a bevel pinion 6 keyed on the shaft 4 and adapted to be selectively either geared with one of two other bevel pinions, respectively 8 and 9, for forward and rearward drive, or left out-of-gear, under the control of a hand lever 7. In this connection there is provided a sleeve member 10 which interconnects the bevel pinions 8 and 9, the assembly 8—9—10 being slidably but non-rotatably mounted on secondary shaft 11.

Both bevel pinions 8 and 9 are keyed on the common secondary shaft 11 positively coupled with the driving pulleys 12 and 13 of two V-belt torque convertors 14 and 15, respectively, of which the driven pulleys 16 and 17, respectively, are positively coupled with independent shafts 18 and 19, respectively. Each of the pulleys 16 and 17 includes two sections, one of which is fixed axially on the respective secondary shaft 18, 19, and the other of which is movable axially along the secondary shaft towards and from said fixed pulley section, each movable pulley section being urged by a spring 50, 51, respectively, towards its associated fixed section.

In the example shown, the above mentioned positive couplings are merely ensured by a respective keying of the driving and driven pulleys on the shaft 11 and the shafts 18—19. Each one of the shafts 18—19 carries a chain pinion, 20—21 linked through a chain (not shown) with a sprocket wheel 22—23. Each wheel 22—23 drives the axle 24—25 of one of the wheels 26—26a. In the example shown, a resilient coupling (27—28) is interposed between each sprocket-wheel (22—23) and the associated axle (24—25).

Incidentally, it is to be pointed out that, in this specification, the expressions "positive transmission" and "positive coupling" are to be understood with their theoretical kinetic meaning. In other words, a given average speed of the driving member of such a transmission or coupling determines a corresponding average speed of its driven member. Thus, the resilient couplings 27 and 28, while allowing for a certain relative torsional deformation between the sprocket wheels 22—23 and the axles 24—25, nevertheless constitute a positive transmission or coupling.

In Fig. 2, there are shown at 12a and 13a, respectively, the outer flanges of the driving pulleys which, in the example shown, are rigid with the common shaft 11 on which are, furthermore, slidably mounted the two inner flanges 12b and 13b of said pulleys, the latter being also rotated by the shaft 11 through gudgeon pins 29—30, respectively, freely slidable within longitudinal slots 31—32 provided, to this effect, on the shaft 11. The latter is hollow and constitutes a kind of cylinder, wherein are slidably mounted two pistons 33—34, respectively, axially movable with the gudgeon pins 29—30 and continuously urged towards each other by an extension spring 35. The piston 34 is solid, while the other piston 33 has formed integral therewith a cylindrical extension 36 provided with a passage 37 establishing a communication of the space comprised between the pistons 33 and 34 with a pipe union 38 interconnected through a duct 39 with an hydraulic control system, generally shown at 40 and adapted to deliver a pressure fluid through duct 39 in a manner described hereinafter.

This device operates as follows: as already mentioned, the hydraulic system 40 is responsive to a regulating factor such as the rotational speed of the engine 1. In response to a variation of said factor, it sends into the space comprised between the pistons 33 and 34 a hydraulic fluid of which the pressure is a direct function of said factor. It will be easily understood that, if the said pressure increases to such a value as to become capable of overcoming the strength of the spring 35, the distance between the pistons 33 and 34 increases, so that the said pistons exert on the inner flanges of the driving pulleys forces tending to bring them nearer the outer ones, i. e. tending to increase the radius of action of the driving pulleys 12—13 on the V-belts 14—15. On the other hand, for a given value of the above mentioned factor and e.g. for a predetermined number of turns of the engine, the distance between the inner flanges of the driving pulleys remains constant and corresponds to transmission ratios of the respective torque convertors having a predetermined arithmetic average. Moreover, the free axial motion of the gudgeon-pins 29—30 within the slots 31—32 allows for an axial displacement of the assembly comprising the two inner flanges with respect to the assembly comprising two outer ones, so that both mentioned ratios, while keeping the same constant arithmetic average, are capable of adjusting themselves automatically and differentially in response to variations of relative rotation speeds of the wheels 26—27.

Fig. 3 shows a constructive embodiment of the automatic clutch 3. 41 is a dish-like member of said clutch, on the inner cylindrical wall of which may be pressed anti-friction coatings provided on two shoes 42—43 of comparatively important weight freely pivoted at 44 and 45 on a disk 46 keyed at 47 on one shaft of the clutch, the other shaft of which is keyed on the dish-like member 41. The shoes 42 and 43 are continuously urged towards each other, i.e. towards declutched position, by means of extension springs 48—49 while clutching is automatically ensured under the action of centrifugal forces above a certain speed of the engine.

While the invention has been described with particular reference to a preferred embodiment, it is not intended to limit the scope of the invention to the embodiment illustrated, nor otherwise than the terms of the subjoined claim.

What is claimed is:

In a motor vehicle having two driven wheel axles, a variable speed multibelt transmission comprising, in combination, a tubular rotary shaft driven by said motor, a pair of axially spaced driving pulleys mounted on said shaft to rotate therewith and each pulley including two sections adapted to engage the sides of a V-belt therebetween, one of said pulley sections being fixed axially and the other being movable axially between a position in which said two sections form a minimum effective pulley diameter and a position in which they form a maximum effective pulley diameter, two axially spaced pistons slidable in said tubular shaft to define therewith a pressure chamber of variable volume, said pistons being drivingly connected each with one of said movable sections, respectively, resilient means arranged in said pressure chamber to urge said two pistons and consequently said movable pulley sections towards the position of minimum effective pulley diameter, means for conducting pressure fluid into said pressure chamber to move said pistons and consequently said movable pulley sections against the action of said resilient means towards the position of maximum effective pulley diameter, two independent rotary shafts extending substantially parallel to said tubular shaft, a pair of axially spaced driven pulleys keyed on said independent shafts and including each two sections one of which is fixed axially and the other of which is movable axially towards and from said fixed driven pulley section, spring means mounted on said independent shafts to urge the movable driven pulley sections towards their associated fixed sections, two V-belts, each trained over one of said driving pulleys and over one of said driven pulleys, respectively, and means for transmitting the speed from said independent shafts to said wheel axles.

References Cited in the file of this patent

UNITED STATES PATENTS

| | | |
|---|---|---|
| 1,203,846 | Burtt | Nov. 7, 1916 |
| 2,047,077 | Lansing | July 7, 1936 |
| 2,295,161 | Clay | Sept. 8, 1942 |
| 2,420,100 | Salsbury | May 6, 1947 |
| 2,529,849 | Curtis | Nov. 14, 1950 |
| 2,582,966 | Curtis | Jan. 22, 1952 |
| 2,754,691 | May | July 17, 1956 |
| 2,760,386 | Southwick | Aug. 28, 1956 |
| 2,789,672 | Forkner | Apr. 23, 1957 |
| 2,810,236 | Long | Oct. 22, 1957 |

FOREIGN PATENTS

| | | |
|---|---|---|
| 5,447 | Great Britain | Mar. 3, 1914 |